July 15, 1958  E. A. VOSS ET AL  2,843,073
AUTOMATIC SOLDER FEEDING MECHANISM
Filed June 3, 1955

Inventor
EDWARD A. VOSS
MILTON WESOLOWSKI

By Killman and Kerst
Attorneys

United States Patent Office 2,843,073
Patented July 15, 1958

2,843,073

AUTOMATIC SOLDER FEEDING MECHANISM

Edward A. Voss and Milton Wesolowski, Baltimore, Md., assignors to Bendix Aviation Corporation, Towson, Md., a corporation of Delaware Application June 3, 1955, Serial No. 513,050

1 Claim. (Cl. 113—109)

This invention relates to soldering irons and more particularly to a means for the automatic power feeding of predetermined amounts of solder to the tip of a soldering iron.

The invention is particularly advantageous in the manufacture of electrical or electronic equipment utilizing assembly line techniques in which an operator must perform repetitive soldering operations for several hours at a time. In such operations the soldering iron is usually suspended in front of and somewhat above the operator and as each unit is brought in front of her she adds components, pulls down the soldering iron and makes the necessary soldered joints. In doing this it is necessary to hold the iron with one hand and feed solder with the other. It would be a considerable advantage to the operator to have one hand free for any necessary task in connection with the soldering iron, such as steadying the work piece, or positioning components or their leads in a desired location.

Efforts have been made to provide automatic solder feeding arrangements for such irons. In some of these attempts means have been provided by which the operator could manually advance the strip or wire of solder with the hand holding the iron. Such devices, while theoretically offering a solution, require the operator to exert a considerable amount of force with the hand to effect the feeding operation. This, after several hundred repetitions, leaves the operator exhausted. Other attempts have been made which involved the feeding of a strip or wire of solder by means of an electrical or air actuated equipment auxiliary to the iron. These previous attempts, however, required the use of additions to the iron which were so bulky or heavy as to render their use impractical.

It is an object of this invention to provide a means for the power feeding of solder to the tip of a soldering iron which may be attached to the iron and operated by the hand holding the iron without causing undue fatigue to the operator.

It is another object of the invention to provide such a means which will not render the soldering iron unduly heavy or bulky and will still enable it to be used in confined spaces to make effective and precisely located joints.

It is a further object of the invention to provide such a means which may either be built into a soldering iron or added to existing soldering irons.

These and other objects and advantages of the invention are realized in a solder feeding mechanism in which an air actuated piston is utilized for the feeding of the solder. The solder is in wire form and is fed through the air operated piston and its cylinder and from thence through a tube which directs it to the tip of the iron. An easily operated, thumb actuated, valve is provided in a location such that the hand grasping the handle of the soldering iron can also manipulate the valve.

Figure 1:
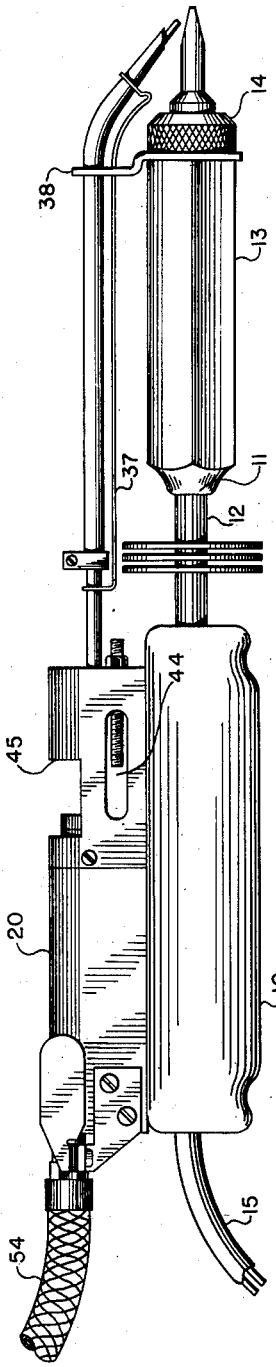
Fig. 1 is an elevational view of a soldering iron of conventional form having attached thereto a solder feeding mechanism embodying the invention.
Figure 2:
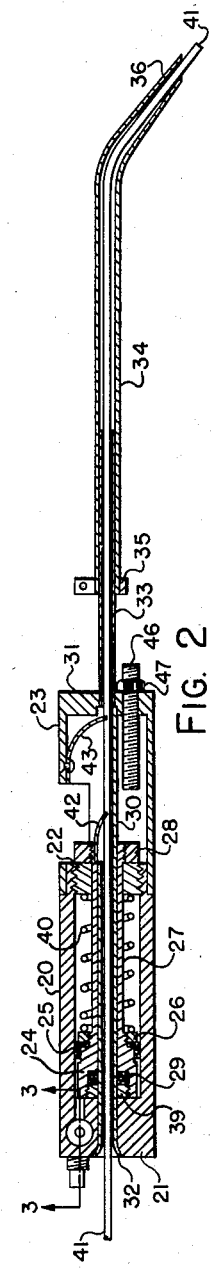
Fig. 2 is a cross-sectional view of the solder feeding mechanism of Fig. 1 with the section taken along the longitudinal axis thereof.

Referring now more particularly to the drawings, there is shown in Fig. 1 a soldering iron of conventional form having a handle 10 and a heating element 11. This latter element consists of a shaft 12 of relatively small diameter which screws into the end of the handle, and an enlarged portion 13 which contains an electrical heating coil. A tip element 14 screws into the free end of portion 13. Wires 15 pass through the handle and the shaft 12 to the heating coil in the portion 13.

Secured to the iron by any desired conventional fastening means is the device embodying the invention. In the embodiment shown the device includes an air cylinder 20 having one closed end 21 and having its other end closed by a plug 22 which is screwed therein. Secured to the forward end of the cylinder 20 is a housing 23 which has its free end closed. Sliding within the cylinder 20 is a piston 24 having its base abutting the end 21 of the cylinder and being shouldered to retain an air sealing washer 25 which is held in place by a nut 26 screwed onto a threaded reduced portion of the piston. The end of the piston opposite its base is extended in the form of a sleeve 27 which slides through a hole in the center of the plug 22 and terminates in a threaded end on which is screwed a nut 28.

Extending through the center of the end 21 of the piston 24, the sleeve 27 and the plug 22, is a tube 30. This tube extends on beyond the nut 28 and terminates in a bore in the closed end 31 of the housing 23. The tube 30 is swaged into the end 21 of the cylinder 20, as indicated at 32, to secure it into an immovable air tight relation to that end of the cylinder and to provide a tapered entrance for the reception of the wire of solder. The base of the piston 24 is bored out to receive packing 29 held in place and expanded by a screwed-in plug 39.

Swaged or otherwise immovably secured into the center of the end 31 of housing 23 is a second tube 33, the bore of which acts as an extension of the bore of the tube 30. The tube 33 extends in parallelism with the axis of the soldering iron and terminates opposite the mid-portion of the element 13 of the iron. Surrounding a portion of the free end of the tube 33 is a third tube 34. This tube is slidably movable along the tube 33 and is held in a selected position by means of a split collar 35 surrounding the end nearest the housing 23. The other end 36 of the tube 34 is bent toward the tip of the soldering iron and progressively reduced in diameter, terminating at a point adjacent the tip. A heat shield 37 consisting of a ribbon of polished metal is secured over the sleeves 33 and 34 by having its end portions bent at right angles to its mid-portion and provided with holes through which the sleeves may slide. The sleeve 34 is secured with respect to the heating element of the iron by means of a bracket 38 of sheet metal which at one end is secured to the iron between the elements 13 and 14 and at its other end fits over the tube 34. The shield 37 extends through a slot in this member.

A spiral spring 40 extends between the nut 26 on the piston and the plug 22 of the air cylinder and normally holds the piston against end 21 as illustrated. The wire of solder to be fed extends as shown at 41 through the tubes 30, 33 and 34. Two wire engaging members are provided in the housing 23, the first 42 being secured between the sleeve 27 of the air piston and the nut 28, and the second 43 being riveted or otherwise secured to the upper portion of the housing 23. These members are of resilient metal and their ends are bent down to a position such that they engage the solder wire. The upper half of the sleeve 30 is cut away within the housing 23 to permit this action. The housing 23 is also cut away as shown at 44 and 45 to permit inspection and assembly of the element contained therein. The housing 23 is also provided with a screw stop 46 which is threaded through the wall 31 and locked into a selected position by means of a nut 47.

Figure 3:
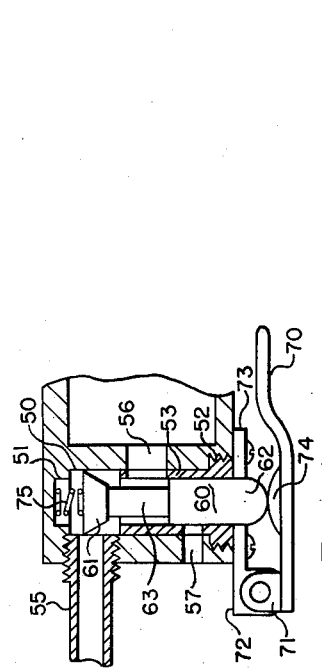
Fig. 3 is a cross-sectional view of the valve mechanism of the solder feeding device of Figs. 1 and 2 with the section taken along the line 3—3 of Fig. 2.

The end 21 of the cylinder 20 is provided with an air feeding mechanism as best illustrated in Fig. 3. This includes a horizontal bore 50 extending almost through the cylinder at this point and located above the tube 30. At the inner end of the bore 50 is a bore 51 of smaller diameter. At the outer end of the bore 50 is a larger coaxial bore 52 which is threaded. Inserted into the bores 50 and 52 is a sleeve-like plug 53, the outer end of which is threaded into the bore 52. A compressed air line 54 terminates in a fitting 55 threaded into the cylinder and communicating with the bore 50 in its inner end. An opening 56 located centrally of the cylinder, when seen from above, extends from the interior of the cylinder through the sleeve 53 and into the bore 50. An exhaust opening near the outer end of the bore 50 extends through the sleeve 53 and the end 21 to the exterior of the cylinder as indicated at 57. Contained within the bore 50 and the sleeve 53 is a valve 60. The inner end 61 of this valve is conical in form with its free end conforming to the diameter of the bore 50. The outer end of this valve is a cylindrical portion 62 which slides within and fills the bore of the sleeve 53. The portions 61 and 62 are joined by a portion 63 of smaller diameter than the bore of the sleeve 53.

The valve operating mechanism consists of a thumb actuated plate 70 having one of its ends free and its other end 71 pivoted to a mating portion 72 of a bracket 73 secured to the cylinder 20 by conventional means. The inner surface of the plate 70 is provided with a rounded raised portion 74 which coacts with the portion 62 of the valve. The valve 60 is normally urged to its outer-most position in the bore 50 by a spring 75 between the part 61 and the base of the bore 51.

In the operation of the disclosed device the valve 60 is normally urged to its outer-most position as described above. This closes off the inner end of the sleeve 53 with respect to the air pressure of the line 54. With the valve in this position the cylinder 20 is vented to the atmosphere through the ports 56 and 57 and the piston 24 is maintained in its position of rest against the end 21 by the spring 40. An operator in using the iron grasps the handle 10 with one hand, the hand also encircling the cylinder 20 and the housing 23. If it is desired to feed more solder to the iron the operator presses the plate 70 with the thumb or other part of the hand, thus pressing the valve 60 to its innermost position. This action admits air from the hose 54 to the port 56 by way of the space surrounding the reduced portion 63 of the valve. The piston 24 is actuated and the solder engaging member 42 pushes the wire of solder along the tube 30 as the piston travels. Travel of the piston is limited by engagement of the nut 28 with the stop 46. When the valve is released the cylinder is vented through the port 56 and the piston returns to its position of rest. During the return stroke of the piston the solder wire is held from movement by the action of the member 43.

While the automatic feeding means is shown and described as an attachment for existing irons, it is apparent that it could be incorporated into the structure of a soldering iron by forming the handle of the iron as an integral part of the cylinder 20 and housing 23. The parts 20 and 23 could act as the handle with the heating element attached thereto. The valve actuating mechanism could also be altered so that the part engaged by the hand would would be located at any desirable plate along the handle, where convenient for the operator. Even as shown, the cylinder 20 and housing 23 may be considered as parts of the handle of the iron, since all are grasped.

Feeding of the solder through the cylinder and piston effects a simplification in previously known structures, doing away with the necessity of providing bulky and cumbersome cross head structure for controlling the feed of the wire in response to the action of the air cylinder. The result is a light, compact, practical unit which can be used repetitively for long periods of time without unduly fatiguing the operator.

While air is mentioned as the source of power for the device, other gases or liquids under pressure may also be used and are collectively referred to in the following claim as fluids.

What is claimed is:

A soldering iron comprising: a handle, an elongated heating element terminating in a solder applying tip, said heating element being secured to one end of said handle in a coaxial relationship, a closed cylinder forming a part of said handle and having a longitudinal axis parallel with the longitudinal axis of said handle, a piston sliding in said cylinder, means biasing said piston to a position of rest at the rear of said cylinder, a housing secured to said cylinder and extending forwardly thereof, a tube dimensioned to receive a wire of solder for freely sliding movement therethrough, said tube extending coaxially through said cylinder and piston and through said housing and terminating adjacent the said tip, said tube being immovably fixed to said cylinder and said housing, the portion of said tube within said housing having one side open, said piston being provided with a forwardly extending portion passing through an opening formed in the forward end of said closed cylinder and terminating within said housing, means carried by said forwardly extending portion of said piston within said housing and engaging said solder wire through said open side of said tube to move said solder in a forward direction as said piston moves forwardly, means secured to said housing and engaging said solder wire through said open side of said tube to prevent said solder wire from moving rearwardly, means including a valve for providing fluid under pressure between said piston and the rear of said cylinder, hand operated means for actuating said valve, the last named means being located on said handle, and stop means carried by said housing engaging said forwardly extending portion of said piston during its forward motion to limit the extent of said forward motion.

References Cited in the file of this patent

UNITED STATES PATENTS

| | | |
|---|---|---|
| 1,951,441 | Rock | Mar. 20, 1934 |
| 2,433,514 | Hughey | Dec. 30, 1947 |
| 2,604,064 | Sefton | July 22, 1952 |

FOREIGN PATENTS

| | | |
|---|---|---|
| 168,783 | Great Britain | Sept. 15, 1921 |